Sept. 1, 1959 TOMIJI TARUKAWA 2,902,188
APPARATUS FOR THE AUTOMATIC MEASUREMENT OF AN
AMOUNT OF ANY POWDERY STOCK-MATERIAL
Filed Jan. 6, 1958 2 Sheets-Sheet 1
Fig-1-
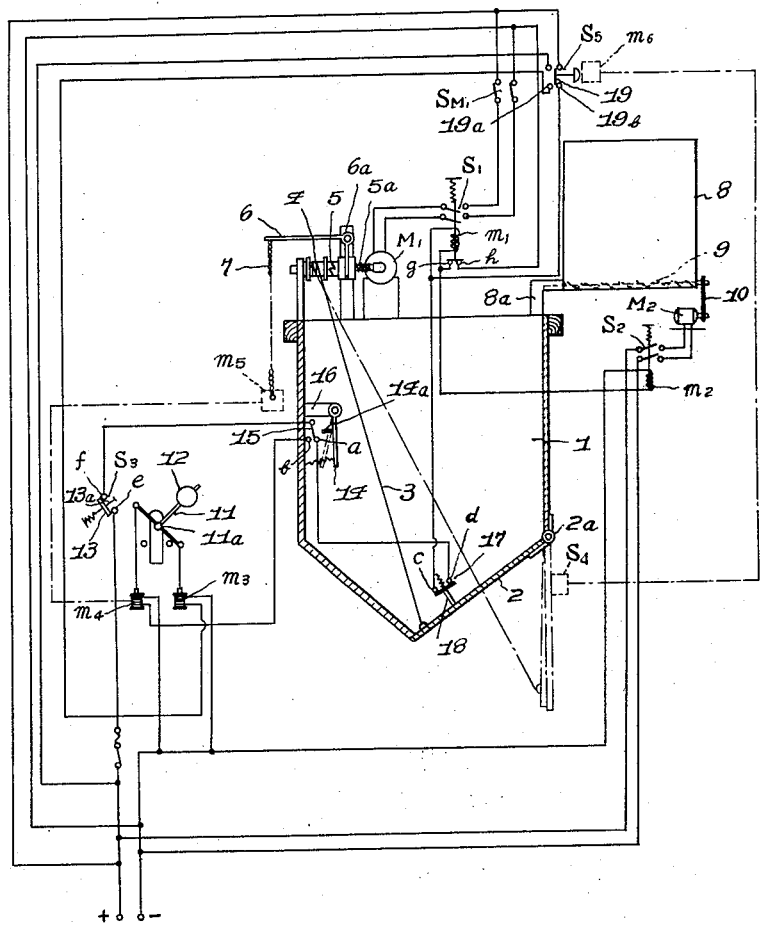
Fig-1A-
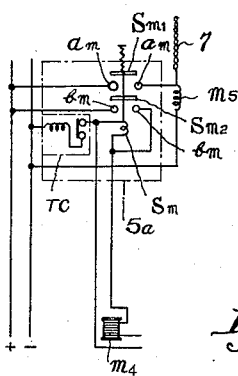
Inventor
T. Tarukawa
Attys.

Sept. 1, 1959 TOMIJI TARUKAWA 2,902,188
APPARATUS FOR THE AUTOMATIC MEASUREMENT OF AN
AMOUNT OF ANY POWDERY STOCK-MATERIAL
Filed Jan. 6, 1958 2 Sheets-Sheet 2
Fig. 2.
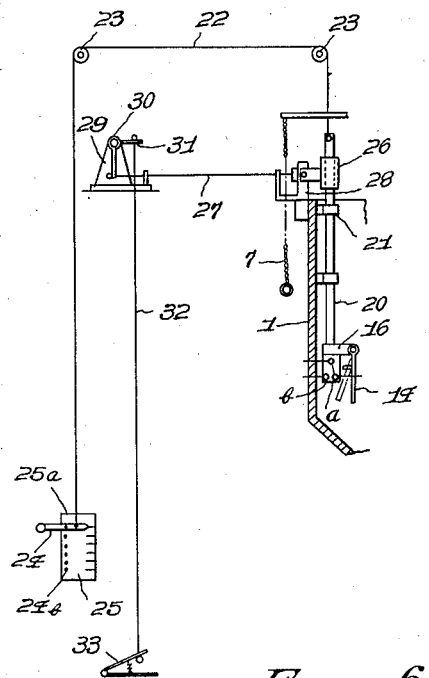
Fig. 3.
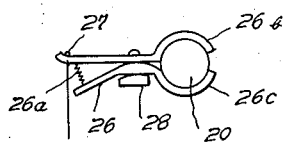
Fig. 4.
Fig. 6.
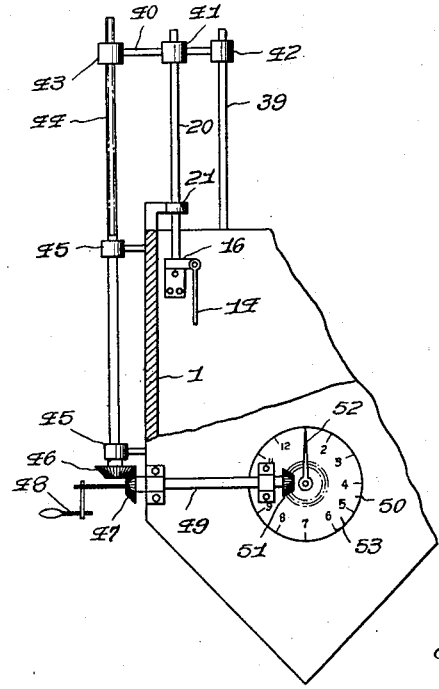
Fig. 5.
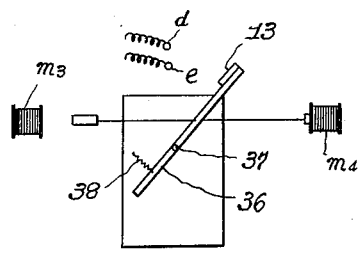
Inventor
T. Tarukawa
By Glascock Downing Aubold
Attys

United States Patent Office 2,902,188
Patented Sept. 1, 1959

2,902,188

APPARATUS FOR THE AUTOMATIC MEASUREMENT OF AN AMOUNT OF ANY POWDERY STOCK-MATERIAL

Tomiji Tarukawa, Itabashi-ku, Tokyo-to, Japan

Application January 6, 1958, Serial No. 707,251

Claims priority, application Japan January 8, 1957

7 Claims. (Cl. 222—63)

This invention relates to an improved apparatus capable of carrying out automatic measurement of an amount of any powdery stock-material.

An essential object of this invention is to provide an improved apparatus which can carry out the measurement of any powdery stock-material in an automatic and accurate manner without overfilling a container.

Another object of this invention is to provide an improved apparatus which can charge automatically any powdery stock-material into a measuring tank upon closing of a discharge door of said tank and can stop automatically said charging upon charge of a predetermined amount of the stock-material into said tank.

A further object of this invention is to provide an improved apparatus which can charge automatically any powdery stock-material into a measuring tank upon closing of a discharge door of said tank, stop automatically said charging upon charge of a predetermined amount of the stock-material into said tank, and discharge said charged stock-material upon stop of said charging.

A still further object of this invention is to provide an improved apparatus which can carry out automatically and continuously the charging and discharging of a powdery stock-material of a predetermined amount into and from a measuring tank.

Said objects and other objects of this invention have been attained by the apparatus which comprises a measuring tank having a discharge door hinged to said tank so as to be opened and closed; a winding device capable of closing said door; a stock-material accumulator; an electric motor capable of charging the stock-material from said accumulator into said measuring tank; a first switch which is operated upon closing of said door, said switch being used to commence said charging of the stock-material into said measuring tank; a second switch device which is equipped in said tank at a predetermined level corresponding to a predetermined amount of the stock-material in said measuring tank so that said switch device may be operated by the pressure of the stock-material charged in said measuring tank, said switch device being used so as to stop said charging of the stock-material; and a turning device which is quickly turned from a state to another state upon operation of said second switch device so as to secure the stop of the stock-material charging without relation to the chattering of said second switch device.

The novel features which I believe to be characteristics of my invention are set forth with particularity in the appended claims. My invention itself, however, both as to its manner of construction and manner of operation together with further objects and advantages thereof, may best be understood by reference to the following description taken in connection with the accompanying drawings, in which the same members are indicated by the same numerals and characters, and in which:

Fig. 1 is a schematic side view of an example of this invention, in which the measuring tank is shown by a sectional view.

Fig. 1A is a connection diagram of a relay switch device to be used in the example in Fig. 1.

Fig. 2 is a schematic side view of a device for adjusting the control member of the relay device in the example in Fig. 1.

Fig. 3 is a plan view of the holder 26 in the device illustrated in Fig. 2.

Fig. 4 is a schematic side view of a quick turning mercury switch which can be used in this invention.

Fig. 5 is a schematic side view of another quick turning switch which can be used in this invention.

Fig. 6 is a schematic side view of a modification of the device illustrated in Fig. 2.

Referring to Fig. 1, a measuring tank 1 is provided with a discharge door 2 hinged thereto at a pivotal shaft 2a. A wire rope 3 wound around a winding shaft 4 which is mounted on the tank 1 is fixed at its free end to the door 2. The shaft 4 is driven through a clutch 5 by an electric motor $M_1$ mounted on the tank 1 so as to wind up the wire rope 3, said motor $M_1$ being connected to an electric source through a starting switch $S_M$ and a control electromagnetic switch $S_1$ of the type capable of being opened upon excitation of the electromagnet $m_1$. The clutch 5 is attached to one arm of a crank-lever 6 pivoted at a pivotal shaft 6a and is so designed that it can be released through said crank-lever by pulling a wire or chain 7 against the force of a spring 5a which in turn is wound around the rotary shaft of the motor $M_1$.

When the clutch 5 is released, the door 2 can be opened by its self-weight and the weight of the stock-material applied thereon, because the rope 3 can be unwound freely.

For charging any powdery stock-material, the apparatus is provided with a stock-material accumulator 8 having a discharge pipe 8a which is positioned above the tank 1. On the bottom of the accumulator 8 is equipped a conventional screw conveyer 9 which is driven by an electric motor $M_2$ through a belt 10 or a gear train, said motor being made to start when the switch $S_2$ is closed by an electromagnet $m_2$. At a predetermined level in the tank 1, a control member 14 is pivoted, at its top end, to a supporter 16 which is attached to the tank 1, said member being provided with a pin 14a. A movable contact piece 15 and stationary contacts $a$ and $b$ are arranged at the position near said pin 14a so that when said member 14 is pushed leftward to such a position as shown by chain line, the movable contact piece 15 may be brought in contact with the stationary contact $b$ and when said member 14 is restored by a spring, said piece 15 may be brought in contact with the stationary contact $a$. On the other hand, a movable contact piece 17 and stationary contacts $c$ and $d$ are arranged at the position near the door 2 so that when said contact piece 17 is pushed by a pin 18 attached to the door 2, the contact piece 17 may be brought in contact with the contacts $c$ and $d$ and when the door 2 is opened, the contact piece 17 may be detached from the contacts $c$ and $d$.

A bell-crank 11 having an upright arm which is provided with a weight 12 screwed thereon is pivoted at its pivotal shaft 11a so that it may be turned rightward or leftward by excitation of the electromagnets $m_3$ or $m_4$, said magnet $m_3$ being connected to an electric source through the starting contacts 19a, and said magnet $m_4$ being connected to said electric source through the contact $b$, contact piece 15 and a switch $S_3$ which consists of a movable contact piece 13 having a pin 13a and stationary contacts $e$ and $f$. Said switch $S_3$ is arranged so that when the bell-crank 11 is turned leftward, the pin 13a may be pushed by the weight 12, whereby the contact piece 13 may be detached from the contacts $e$ and $f$.

The operation of the apparatus illustrated in Fig. 1 is as follows:

In the opened state of the door 2, when the motor switch $S_M$ is closed, the motor $M_1$ starts so as to drive the shaft 4 because of closing of the switch $S_1$ due to opening of the contacts $c$ and $d$, whereby the wire rope 3 is wound, the door 2 is closed, and the movable contact piece 17 is brought in contact with the contacts $c$ and $d$ by the pin 18. Accordingly, the circuit consisting of + pole of the electric source, the members $e$, 13, $f$, 15, $a$, $d$, 17, $c$, $m_1$, $m_2$ and — pole of said source is closed, whereby the magnets $m_1$ and $m_2$ are excited.

By the excitation of the magnet $m_1$, the switch $S_1$ is opened and the motor $M_1$ is stopped and the contacts $g$ and $h$ are shortcircuited by a contact piece $m_{1a}$ which is dropped down by the excitation of the magnet $m_1$ and the excitation of the magnet $m_1$ is maintained. By the excitation of the magnet $m_2$, the switch $S_2$ is closed and the motor $M_2$ starts, whereby the powdery stock-material in the accumulator 8 is charged automatically into the tank 1 through the discharge pipe 8a.

When the charged stock-material in the tank 1 increases to a predetermined level, the control member 14 is pushed to such a position as shown by chain line, whereby the contact piece 15 is detached from the contact $a$ and is brought in contact with the contact $b$. Accordingly, the circuit of the magnet $m_2$ is opened, whereby the switch $S_2$ is opened and the stock-material charging is stopped. In this case, the switch $S_1$ is maintained at its opened state, because the magnet $m_1$ is excited through the contacts $g$ and $h$.

On the other hand, by the contacting of the contact $b$ with the contact piece 15, the exciting circuit of the magnet $m_4$ is closed through the contact $f$, contact piece 13 and contact $e$, whereby the bell-crank 11 is turned leftward and the contact piece 13 is pushed by the weight 12 and the contacts $e$ and $f$ are opened so as to secure the opened state of the exciting circuit of the magnet $m_2$ even when the control piece 15 makes chattering action.

Next, when it is desired to discharge the stock-material in the tank 1, it is only necessary to pull down the chain 7, whereby the clutch 5 is disclutched through the crank-lever 6 and the winding shaft 4 is released. Accordingly, the door 2 is opened to such a position as shown by chain line due to the weight of the stock-material and the self-weight of said door 2, whereby the charged material is discharged.

The next closing of the door 2 can be easily carried out by restoring the chain 7 so as to make the clutch 5 engage with the shaft 4 and by pushing temporarily the push-button $S_3$ to open the contacts 19b so as to open the circuit of the contacts $g$ and $h$, whereby the magnet $m_1$ is demagnetized, the switch $S_1$ is closed and the motor $M_1$ is started so as to wind up the wire rope 3.

On the other hand, by pushing of said push-button, the contacts 19a are shortcircuited by the contact piece 19 and the magnet $m_3$ is temporarily excited, whereby the bell-crank 11 is turned to such a position as shown in the drawing and the contacts $e$ and $f$ are shortcircuited by the contact piece 13.

Then, as described already, the door 2 is closed and the charging of the stock-material is carried out automatically.

The embodiment in Fig. 1 relates to the apparatus, in which the closing of the discharge door 2 and the stock-material charging are continuously and automatically carried out, but the discharge of the material in the tank is manually operated by pulling the chain 7 so as to disengage the clutch 5. Such apparatus can be used for automatic measurement of an amount of any powdery stock-material.

However, when it is desired to carry out one cycle consisting of the door closing and the charging and discharging of the stock-material, such an automatic operation can be done by providing an electromagnet $m_5$ which is made to operate in response to the operation of the contact piece 15 so as to pull the chain 7 upon charging of a predetermined amount of the stock-material into the tank 1.

Said response may be embodied, for example, by connecting the circuit of the magnet $m_4$ to the magnet $m_5$ through such a relay switch device $m_{5a}$, as shown by chain line, said device being illustrated in Fig. 1A, in which the device $m_{5a}$ consists of an electromagnetic switch $S_m$ provided with contact pieces $S_{m1}$ and $S_{m2}$ and a time switch TC, said contact pieces $S_{m1}$ and $S_{m2}$ being supported so as to shortcircuit, respectively, the contacts $a_m$ in the circuit of the magnet $m_5$ and the contacts $b_m$ when said switch $S_m$ is excited. The exciting coil of the switch $S_m$ is connected to the magnet $m_4$ or to the circuit of the switch $S_3$ in series.

Accordingly, when the contact piece 92 is brought in contact with the contact $b$, the switch $S_m$ is excited and the contacts $a_m$ and $b_m$ are shortcircuited. By the contacting of the contact piece $S_{m2}$ with the contacts $b_m$, the excitation of the switch $S_m$ is maintained even after the switch $S_3$ is opened. By the contacting of the contact piece $S_{m1}$ with the contacts $a_m$, the magnet $m_5$ is excited and the chain 7 is pulled, whereby the door 2 is opened as described already.

The time switch TC is designed so that the exciting circuit of the switch $S_m$ may be opened upon complete opening of the door 2.

Furthermore, when it is required to carry out continuously and repeatedly the door closing and the charging and discharging of the stock-material, it is only necessary to provide such switch $S_4$ and electromagnet $m_6$ as shown by broken line beside the relay switch device $m_{5a}$, said switch $S_4$ being arranged so as to be closed upon complete opening of the door 2 and said electromagnet $m_6$ being arranged so as to be excited by the close of said switch $S_4$ so as to push the push button $S_5$.

The charged amount of the powdery stock-material can be easily adjusted by adjusting the height of the control member 14. Such an example is shown in Figs. 2 and 3, in which the supporter 16 supporting the control member 14 is supported by a rod 20 which is supported by guide members 21 so as to be moved up and down. For holding the rod 20 at its adjusted position, a holder 26 is supported by a supporter 28 mounted on the tank 1, said holder being composed of two holding pieces 26b and 26c which are always pushed toward the rod 20 by a spring 26a so as to grasp said rod. However, when one piece 26b is pulled against the force of said spring 26a, the pieces 26b and 26c are opened, whereby the adjustment of the rod 20 can be done.

The above pulling of one piece 26b can be easily done by pushing a treader 33 which is connected to said piece 26b through the strings 32 and 27, said string being connected at its lower end to said treader 33 and at its upper end to one arm of a crank-lever 31 which is pivoted at a pivotal shaft 30 to a supporter 29, and said string 27 being connected between another arm of said crank-lever 31 and the end of said holding piece 26b. The adjustment of the rod 20 is carried out by a string 22 attached at its one end to the upper end of the rod 20 and at its another end to an adjuster 24 through rollers 23, said adjuster 24 being designed so that it may be stopped after manual movement along a graduation plate 25. Said stop of the adjuster can be done, for example, by engaging a pin 24a attached to said adjuster 24 into a hole 25a of said plate 25.

As the quick turning mechanism for securing the opening of the contacts $e$ and $f$, other mechanisms such as shown in Figs. 4 and 5 may be used. In Fig. 4, a mercury switch 34 supported turnably by a supporter 35 is provided with such contacts $e$ and $f$ as illustrated in Fig. 1 and is connected at both ends to the movable iron cores of such electromagnets $m_3$ and $m_4$ as illustrated in Fig. 1, so that when the magnet $m_4$ is excited, the contacts $e$ and $f$ are quickly opened and when the magnet $m_3$ is excited, the contacts $e$ and $f$ are shortcircuited. In Fig. 5, an insulating lever 36 is pivoted at a pivotal shaft 37 and connected at both sides to movable iron cores of such electromagnets $m_3$ and $m_4$ as illustrated in Fig. 1, said lever 36 being provided with a movable contact 13 which can be brought in contact with the contacts $e$ and $f$ when the magnet $m_3$ is excited, and with a weight 38 thereon. Accordingly, when the magnet $m_4$ is excited, the lever 36 is quickly turned to such a position as shown in the drawing and this position is secured by the weight 38, whereby the contacts $e$ and $f$ are accurately maintained in the opened state.

The adjustment of the control member 14 can also be embodied as shown in Fig. 6, in which the rod 20 supporting the supporter 16 of the control member 14 is supported by a supporter 21 so as to be moved up and down, the top portion of said rod being connected to a traverse lever 40 through a member 41. The lever 40 is provided with a nut 43 at its left end and with a guide member 42 at its right end, said member 42 is fitted on an upright rod 39 so as to be moved up and down. An adjusting rod 44 supported by the supporters 45 so as to be rotated is provided with a screw thread at its upper portion and with a bevel-gear 46 at its lower portion, said screw thread being screwed in the nut 43. A bevel-gear 47 is meshed with said gear 46, the shaft 49 of said gear 47 being supported so as to be rotated by a handle 48. A dial plate 53 attached to the tank 1 is provided with a graduation therearound and with a bevel-gear 50 which is meshed with a bevel gear 51 attached to the shaft 49, said gear 50 being provided with a pointing needle 52 at its center axis.

When the handle 48 is rotated to rotate the rod 44, the nut 43 is adjusted up or down together with the rod 20, whereby the position of the control member 14 can be adjusted. Said adjustment can be indicated at the dial plate 53.

While I have described particular embodiments of my invention, it will, of course, be understood that I do not wish my invention to be limited thereto, since many modifications may be made and I, therefore, contemplate by the appended claims to cover all such modifications as fall within the true spirit and scope of my invention.

I claim:

1. An apparatus for the automatic measurement of an amount of any powdery stock-material, which comprises a measuring tank having a discharge door hinged to said tank so as to be opened and closed; a winding device capable of closing said door; a stock-material accumulator; an electric motor capable of charging the stock-material from said accumulator into said tank; a first switch device which is operated upon closing of said door, said switch device being used to commence the charging of the stock-material from said accumulator into said tank; a second switch device which is equipped in said tank at a predetermined level corresponding to a predetermined amount of the stock-material so that said switch device may be operated by the pressure of the accumulated stock-material charged in said tank, said switch device being used so as to stop the charging of the stock-material; and a turnable device which is quickly turned from from one state to another state upon operation of said second switch device so as to open the circuit of said switch device thus securely maintaining the operated state of said second switch device.

2. An apparatus for the automatic measurement of an amount of any powdery stock-material, which comprises a measuring tank having a discharge door hinged to said tank so as to be opened and closed; a winding device which consists of a winding shaft capable of winding a wire rope connected to said door to close said door, an electric motor which drives said winding shaft and a clutch inserted between said shaft and motor; a stock-material accumulator; an electric motor capable of charging the stock-material from said accumulator into the measuring tank; a first switch device which is operated upon closing of said door, said switch device being used to commence the charging of the stock-material from said accumulator into said tank; a second switch device which is equipped in said tank at a predetermined level corresponding to a predetermined amount of the stock-material so that said switch device may be operated by the pressure of the accumulated stock-material charged in said tank, said switch device being an electric switch which opens, upon operation thereof, the circuit of the electric motor for charging the stock-material; and a turnable device consisting of a crank-lever having a weight and pivoted so as to be turned from one side to another side, a contact pair inserted in the circuit of said second switch device so as to be opened upon turning of said crank-lever toward one side, and an electromagnet which is operated by the operation of said second switch device to turn said bell-crank so as to open said contact pair.

3. An apparatus for the automatic measurement of an amount of a powdery stock-material, which comprises a measuring tank having a discharge door hinged to said tank so as to be opened and closed; a winding device which consists of a winding shaft capable of winding a wire rope connected to said door to close said door, an electric motor which drives said winding device and a clutch inserted between said shaft and motor, said clutch being constructed so as to be released manually; a stock-material accumulator; an electric motor capable of charging the stock-material from said accumulator into the measuring tank; a first switch device which is operated upon closing of said door, said switch device being used to commence the charging of the stock-material from said accumulator into said tank, a second switch device which is equipped in said tank at a predetermined level corresponding to a predetermined amount of the stock-material so that said switch device may be operated by the pressure of the accumulated stock-material charged in said tank, said switch device being an electric switch which opens, upon operation thereof, the circuit of the electric motor for the charging of the stock-material; and a turnable device consisting of a crank-lever having a weight and pivoted so as to be turned from one side to another side, a contact pair inserted in the circuit of said second switch device so as to be opened upon turning of said crank-lever toward one side, and an electromagnet which is operated by the operation of said second switch device to turn said bell-crank so as to open said contact pair.

4. An apparatus for the automatic measurement of the amount of a powdery stock-material, which comprises a measuring tank having a discharge door hinged to said tank so as to be opened and closed; a winding device which consists of a winding shaft capable of winding a wire rope connected to said door to close said door, an electric motor which drives said winding device and a clutch inserted between said device and motor; a stock-material accumulator; an electric motor capable of charging the stock-material from said accumulator into the measuring tank; a first switch device which is operated upon closing of said door, said switch device being used to commence the charging of the stock material from said accumulator into said tank; a second switch device which is equipped in said tank at a predetermined level corresponding to a predetermined amount of the stock-material so that said switch device may be operated by the pressure of the accumulated stock-material charged in said tank, said switch device being an electric switch which opens, upon operation thereof, the circuit of the electric motor for the charging of the stock-material; and a turnable device consisting of a crank-lever having a weight and pivoted so as to be turned from one side to another side, a contact pair inserted in the circuit of said second switch device so as to be opened upon turning of said crank-lever toward one side, and an electromagnet which is operated by the operation of said second switch device to turn said bell-crank so as to open said contact pair; and an electromagnet which makes said clutch release upon excitation thereof, said magnet being connected to an electric source so as to be excited upon operation of said second switch device.

5. An apparatus for the automatic measurement of an amount of a powdery stock-material, which comprises a measuring tank having a discharge door hinged to said tank so as to be opened and closed; a winding device which consists of a winding shaft capable of winding a wire rope connected to said door to close said door, an electric motor which drives said winding device and a clutch inserted between said device and motor; a stock-material accumulator; an electric motor capable of charging the stock-material from said accumulator into said measuring tank; a first switch device which is operated upon closing of said door, said switch device being used to commence the charging of the stock-material for said accumulator into said tank; a second switch device which is equipped in said tank at a predetermined level corresponding to a predetermined amount of the stock-material so that said switch device may be operated by the pressure of the accumulated stock-material charged in said tank, said switch device being an electric switch which opens, upon operation thereof, the circuit of the electric motor for the charging of the stock-material; and a turnable device consisting of a crank-lever having a weight and pivoted so as to be turned from one side to another side, a contact pair inserted in the circuit of said second switch device so as to be opened upon turning of said crank-lever toward one side, and an electromagnet which is operated by the operation of said second switch device to turn said bell-crank so as to open said contact pair; an electromagnet which makes said clutch release upon excitation thereof, said magnet being connected to an electric source so as to be excited by the operation of said second switch device; an electric switch which is operated upon complete opening of said discharge door; and an electromagnet which can operate the starting switch when it is excited by the operation of the just said electric switch.

6. An apparatus for measuring and delivering a predetermined quantity of finely divided material comprising in combination, a measuring hopper, a discharge door swingably supported at the bottom of said hopper, a container for holding a supply of the material, means to discharge the material from the container into the hopper, said means including an electric motor and a control circuit therefor, a first switch in said control circuit operable by the closing of said door to start the motor, a second switch in said control circuit operable by the material when it reaches the predetermined quantity in said hopper to stop the motor, and means responsive to operation of said second switch to open the control circuit whereby further and repeated operations of said second switch are inoperative to deliver further material.

7. The invention as set forth in claim 6, wherein the last recited means comprises a third switch connected in series with said second switch and an actuator to open said third switch in response to operation of said second switch, said actuator comprising a rocking beam and at least one electromagnet connected in said circuit to pivot the beam and actuate the said third switch.

References Cited in the file of this patent
UNITED STATES PATENTS

| | | |
|---|---|---|
| 788,015 | Bergman | Apr. 25, 1905 |
| 1,225,813 | Hilton | May 15, 1917 |
| 1,489,938 | Hale | Apr. 8, 1924 |
| 2,466,386 | Curioni | Apr. 5, 1949 |
| 2,568,332 | Genovese | Sept. 18, 1951 |
| 2,610,726 | Howard | Sept. 16, 1952 |